July 31, 1962 P. H. SHERRON 3,046,615

HINGED CEILING TELEPHONE BOOTHS

Filed Dec. 2, 1957 5 Sheets-Sheet 1

INVENTOR.
PERCIVAL H. SHERRON
BY
Rines, Smith & Harding
ATTORNEYS

HINGED CEILING TELEPHONE BOOTHS

Filed Dec. 2, 1957 5 Sheets-Sheet 2

INVENTOR.
PERCIVAL H. SHERRON
BY
Brewer, Smith & Harding
ATTORNEYS

HINGED CEILING TELEPHONE BOOTHS

Filed Dec. 2, 1957 5 Sheets-Sheet 3

INVENTOR.
PERCIVAL H. SHERRON
BY

ATTORNEYS

July 31, 1962 P. H. SHERRON 3,046,615

HINGED CEILING TELEPHONE BOOTHS

Filed Dec. 2, 1957 5 Sheets-Sheet 4

INVENTOR.
PERCIVAL H. SHERRON
BY

ATTORNEYS

July 31, 1962 P. H. SHERRON 3,046,615

HINGED CEILING TELEPHONE BOOTHS

Filed Dec. 2, 1957 5 Sheets-Sheet 5

INVENTOR.

PERCIVAL H. SHERRON

BY

Bauer, Seidel & Harding (signature)

ATTORNEYS

United States Patent Office 3,046,615
Patented July 31, 1962

3,046,615

HINGED CEILING TELEPHONE BOOTHS

Percival H. Sherron, Jamaica, N.Y. (% Sherron Metallic Corporation, 1201 Flushing Ave., Brooklyn 37, N.Y.)

Filed Dec. 2, 1957, Ser. No. 699,983
4 Claims. (Cl. 20—3.5)

This invention relates to hinged ceiling telephone booths and, more particularly, to the stall type telephone booth having a ceiling structure providing a chamber for the reception of electrical and telephone wiring and electrical apparatus such as booth illuminating lamps, fans, etc. and provided with a hinged lower ceiling panel whereby access may be obtained to the interior of the ceiling chamber and the apparatus contained therein for installation and maintenance thereof by downward hinging of the hinged ceiling panel.

Broadly, this structure has been disclosed in my copending patent application Serial No. 307,630 filed September 3, 1952, now Patent No. 2,912,073.

Heretofore hinged panels in telephone booth ceiling structures have been secured in closed positions by means of screws, latches and the like. It is possible for such means to be improperly fastened by a worker and for such means to work loose under conditions of vibration whereupon the hinged or downwardly movable portion of the ceiling panel may fall, strike and injure an occupant of the booth.

It is the primary object of this invention to provide means preventing accidental dropping of the downwardly displaceable or hinged panel portion of a booth ceiling.

It is a further object of this invention to provide means urging a hinged ceiling panel portion to a closed position when the panel is closed and resisting closure of the panel when the panel is in an open position.

It is a further object of the invention to provide safety latch means providing for latching the hinged panel in a closed position and additionally providing an emergency stop in the event the panel should open accidentally as a result of the first mentioned latch means having been improperly latched.

It is a further object of the invention to provide structure accommodating the foregoing objects which, when associated with a telephone booth ceiling, will be mounted completely above the lower ceiling panel and will thus be completely invisible from the interior of the telephone booth.

These and other objects of the invention relating particularly to elements of structure thereof will become evident from the following description when read in conjunction with the accompanying drawings in which.

Figure 1:
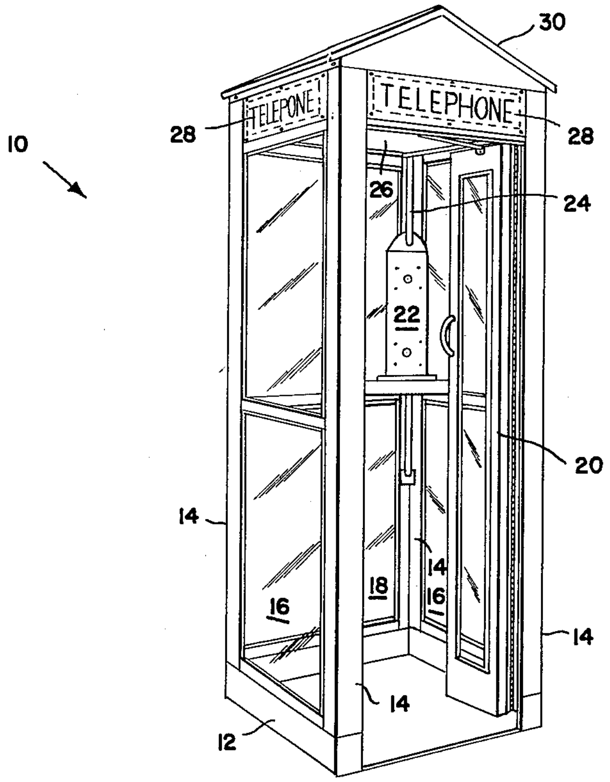
FIGURE 1 is a perspective view of the exterior of an outdoor telephone booth provided with a ceiling structure having a hinged lower ceiling panel.
Figure 8:
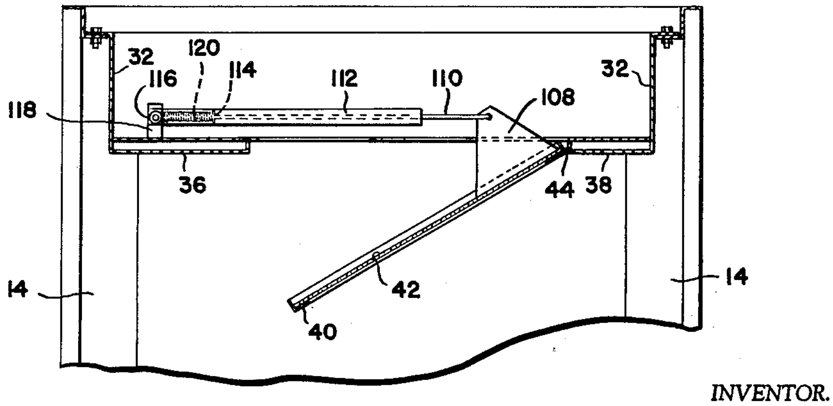
Figure 2:
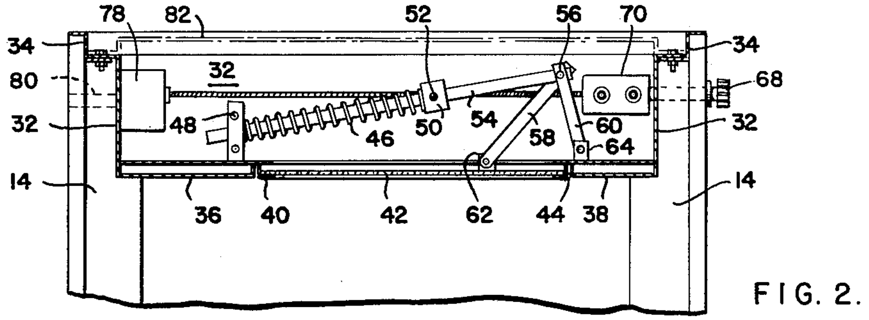
FIGURE 2 is a fragmentary vertical section through the ceiling structure of the booth shown in FIGURE 1 with the top portion of the booth removed.
Figure 10:
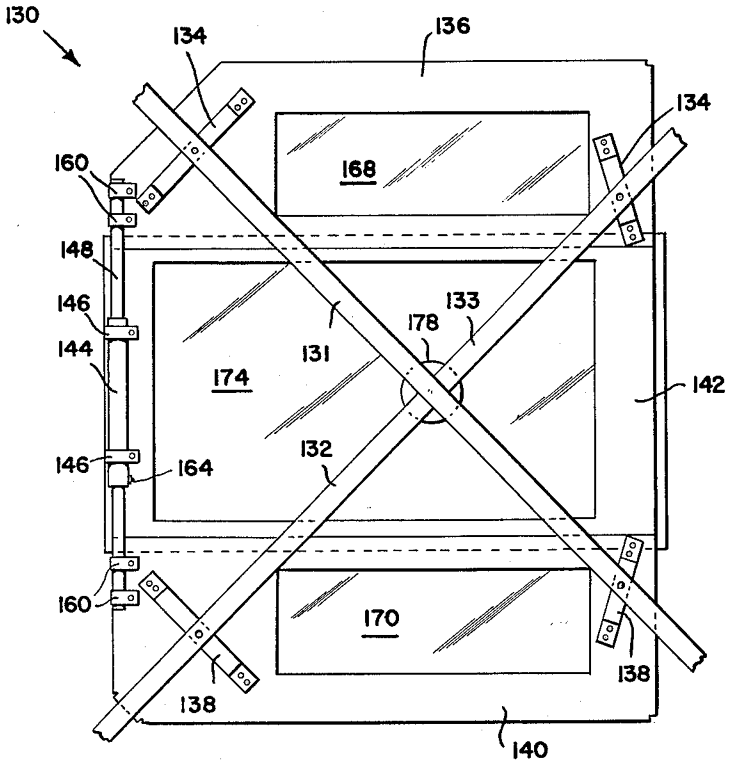
Figure 11:
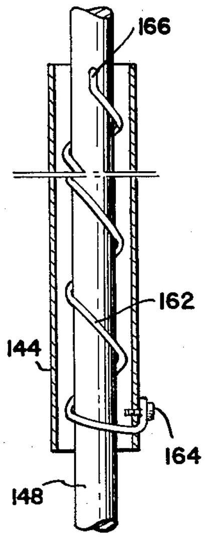
Figure 9:
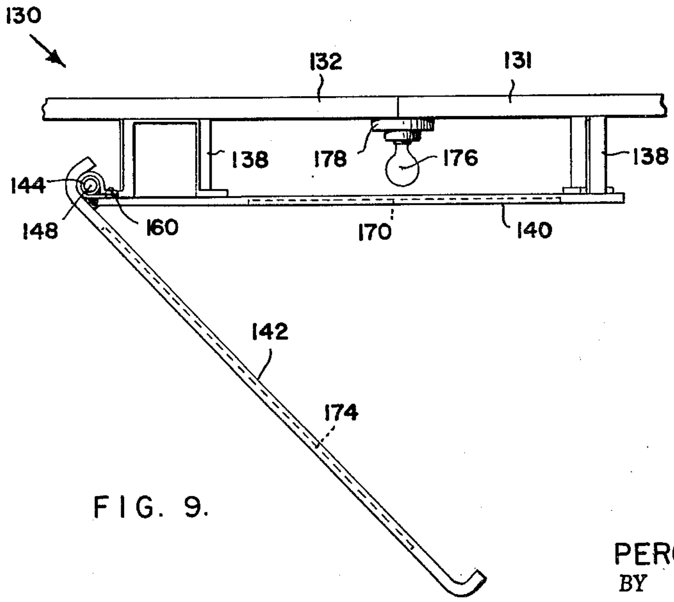
Figures 12, 13, 14:
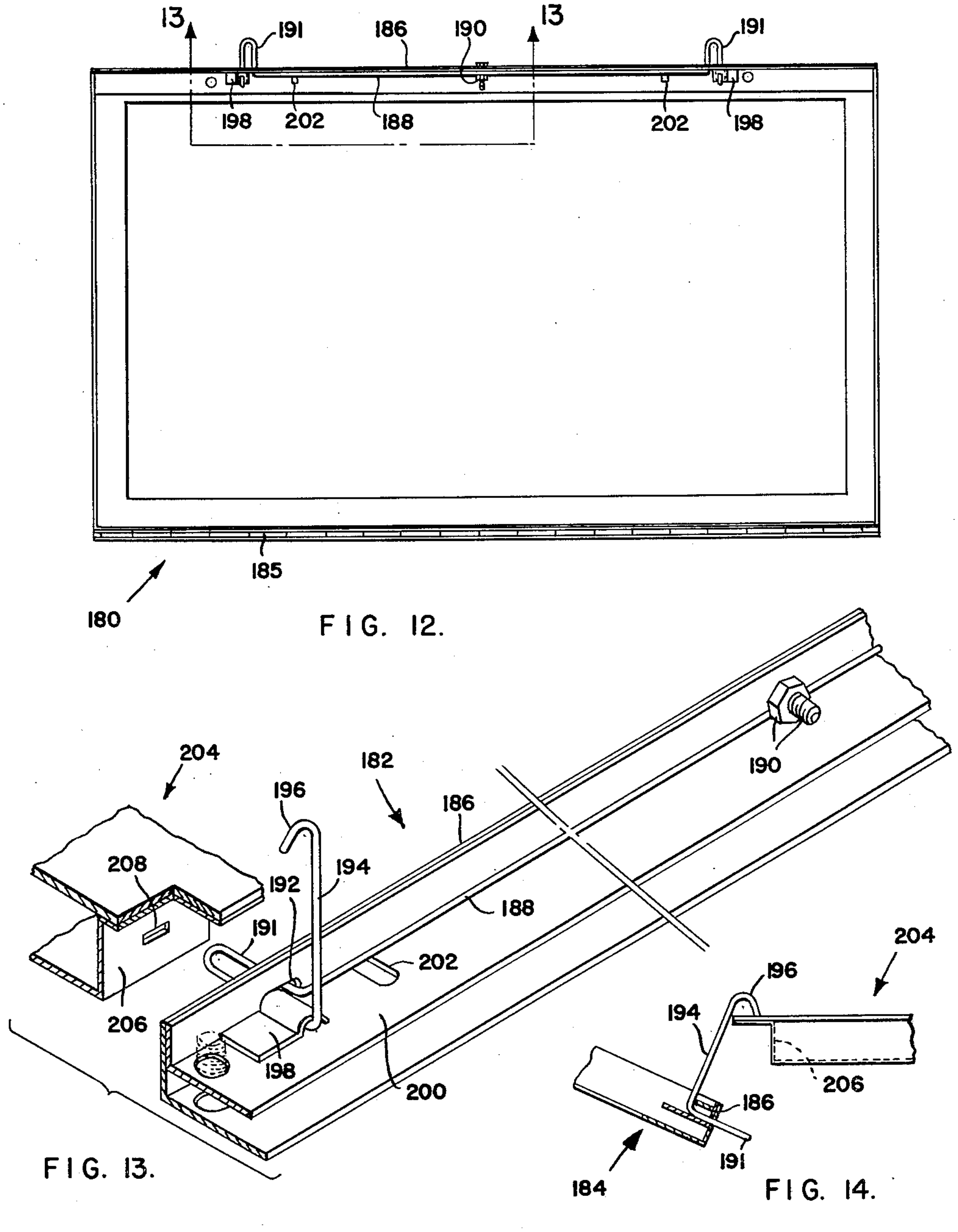

FIGURE 8 s a fragmentary vertical section through the booth shown in FIGURE 1 on the same plane as that shown in FIGURE 2 but showing still another embodiment of the invention and showing the hinged ceiling panel in a partially open position;

FIGURE 9 is a fragmentary vertical section through a modified ceiling construction showing another form of the invention;

FIGURE 10 is a plan view looking down on the structure shown in FIGURE 9;

FIGURE 11 is an enlarged fragmentary portion of the structure shown in FIGURE 10 drawn partly in section;

FIGURE 12 is an enlarged showing of a hinged ceiling panel having latch means mounted thereon;

FIGURE 13 is an enlarged fragmentary portion of the hinged ceiling panel shown in FIGURE 12 showing the latch means thereon and showing a fragmentary portion of an adjacent stationary ceiling panel; and FIGURE 14 is a sectional showing of the elements shown in FIGURE 13 in a safety latch operative position.

In FIGURE 1 there is indicated generally at 10 a complete telephone booth structure. This structure includes a base 12 on which there are mounted four corner posts 14. Side panels 16 and rear panels 18 are mounted between the corner posts and a door assembly 20 is mounted between the front corner posts.

In a rear corner of the booth there is shown a telephone mounting panel 22 which is supported by a conduit 24 extending upwardly into the booth ceiling structure 26. The conduit 24 serves not only to mount the telephone panel 22 but also to carry telephone wiring between a telephone mounted on the panel 22 and the ceiling chamber of the telephone booth.

Above the side panels and above the doors of the telephone booths are lintel panels 28 which may, if desired, bear the word "Telephone." This booth structure may provide for illumination of these lintel panels from illuminating means inside the telephone booth ceiling structure. Structure such as this is disclosed in my copending patent application Serial No. 395,447 filed December 1, 1953, now Patent No. 2,881,306.

A roof structure 30 is positioned on top of the telephone booth and is employed when the booth is provided for outdoor installation. If the booth is provided for enclosed or indoor installation, a simple closure panel may be provided as will be hereinafter described if the roof structure is not employed.

Figure 3:
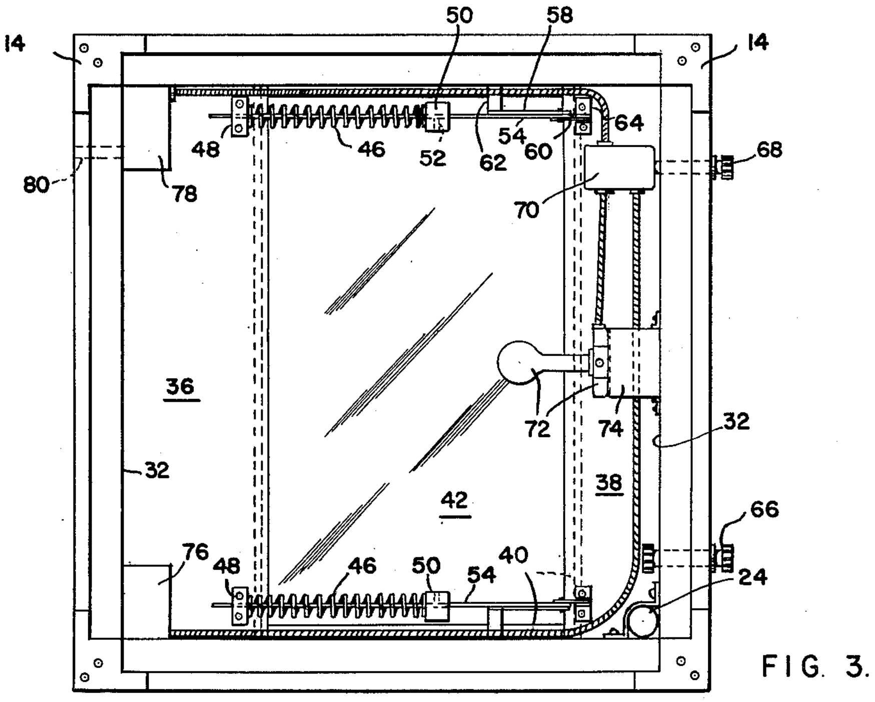
FIGURE 3 is a plan view looking down on top of FIGURE 2.
Figure 4:
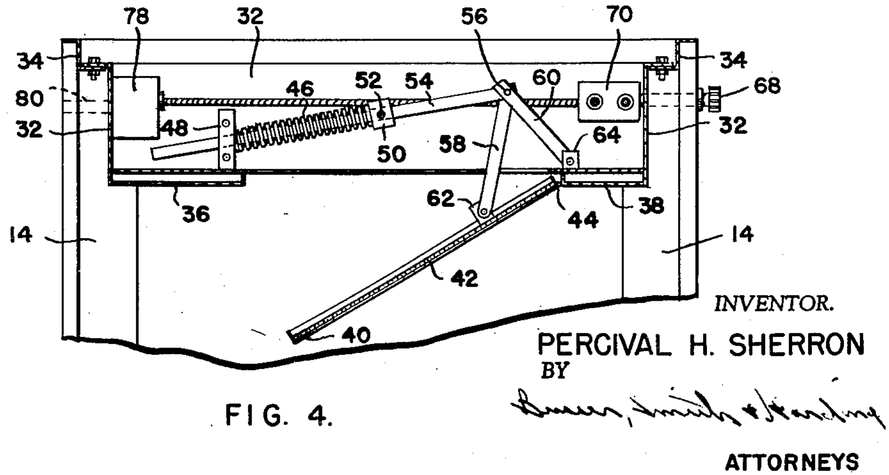
FIGURE 4 is a vertical section taken on the same plane as that shown in FIGURE 2 but showing the hinged panel portion of the booth ceiling in a partially open position.

In FIGURES 2, 3 and 4 there is shown a ceiling structure including four vertically extending sides 32 supported by means of angles 34 from the corner posts and from the sides of the booth. The bottom of the ceiling structure is formed by two horizontally extending panels 36 and 38 fixed to the lower edges of panels 32 and an angle frame 40 supporting a glass panel 42 between the stationary panels 36 and 38. The angle frame 40 is hinged to the stationary panel 38 by means of a piano hinge 44.

The hinged panel assembly 40, 42 is maintained in a closed position as shown in FIGURES 2 and 3 by means of a pair of springs 46. Each of the springs 46 acts between an abutment 48 and a block 50. The abutments 48 are each mounted on the stationary panel 36 and the blocks 50 are each secured by means of a set screw 52 on a rod 54 extending through its associated spring 46. One end of each of the rods passes through its block 48 and the other end of each of the rods is pivoted to one end of each of a pair of links 58 and 60 as indicated at 56. The other end of the link 58 is pivotally connected to an angle bracket 62 mounted on the angle frame 40 and the other end of the link 60 is pivotally connected to an angle bracket 64 mounted on the stationary panel 38.

It will be evident upon viewing FIGURES 2–4 that the blocks 50 may be adjustably positioned on the rods 54 and secured thereto by means of the set screws 52 in order to provide sufficient spring force urging the rods 54 to the right as viewed in FIGURES 2 and 3 to hold the hinged panel in the closed position.

However, when the hinged panel is pulled downwardly passing through the position shown in FIGURE 4 the springs 46 are compressed by the rotation of the link 60 in a counterclockwise direction around its mounting angle 64 as viewed in FIGURE 4 until the pivotal connection 56 between the upper or left-hand end of the link 60 and the right-hand end of the rods 54 passes a dead center position, at which time the link will extend downwardly and to the left of the mounting 64 and further movement of the hinged panel in a counterclockwise direction around its hinge 44 will result in expansion of the springs 46. Thus, when the panel has been opened beyond this critical position the springs 46 will urge the panel to an open position. Thus, the arrangement disclosed provides both an insured closure of the panel while, at the same time, provides for the panel remaining in a fully open position while a workman standing inside the telephone booth is working through the panel opening and on apparatus contained within the ceiling structure such as will now be described.

The panel 38 is provided with an opening through which extends the upper end of the conduit 24. A lead in bushing 66 is provided for the entry of telephone wires into the booth. The telephone wires are passed through the bushing and down through the conduit 24 to a telephone mounted on the panel 22 within the booth. Electrical power for operation for both lighting and ventilating means is brought into the booth ceiling chamber through a conduit 68 and into a connection box 70. From this box connections are made to an illuminating lamp and mounting arrangement 72 supported by means of a bracket 72 from the rear ceiling chamber wall 32. The lamp is controlled by means of a door switch 76 actuated in a conventional manner by the booth door and the lamp may also be controlled by means of a light sensitive mechanism 78 responsive to the intensity of outdoor light which passes to the control through a passage 80 extending through the front lintel of the telephone booth.

Ventilating fans and other apparatus are conventionally provided in the booth ceiling structure. It will be evident that the hinged panel assembly provides access to all such apparatus within the telephone booth ceiling structure from the interior of the booth.

In FIGURE 2 there is indicated in construction lines at 82 a cover plate for the booth ceiling structure. When a structure is employed, such as shown in FIGURE 1, and provided for outdoor operation the roof covering the booth serves adequately to enclose the upper side of the ceiling chamber and, in effect, forms an upper ceiling chamber closure panel. When, however, the booth is provided for indoor installation there is no need to mount a roof structure over the booth, it is necessary, however, to close the ceiling structure to maintain cleanliness within the structure. In this type of installation a closure plate such as that indicated at 82 in FIGURE 2 is employed. It should be noted that hereinafter the claim language referring to the top closure for the telephone booth ceiling structure is intended to refer either to the roof structure or to a closure panel such as the panel 82 shown in this figure.

Figure 5:
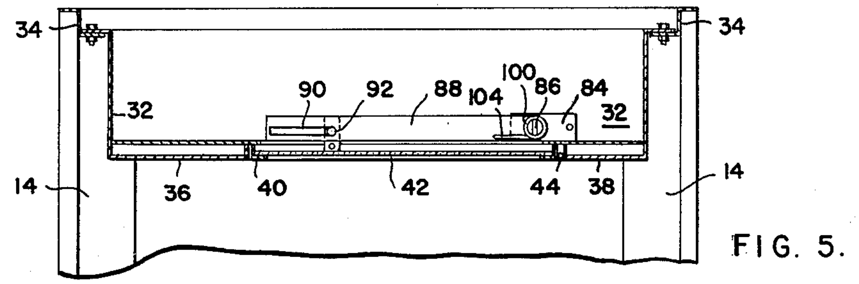
FIGURE 5 is a fragmentary vertical section through the booth shown in FIGURE 1 showing an alternative embodiment of the invention.
Figure 6:
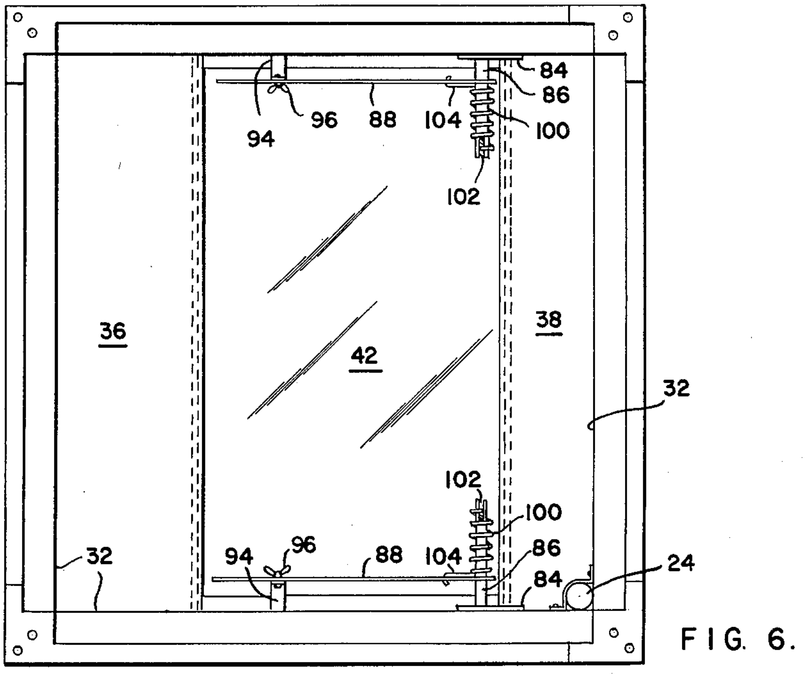
FIGURE 6 is a plan view of the portion of the structure shown in FIGURE 5.
Figure 7:
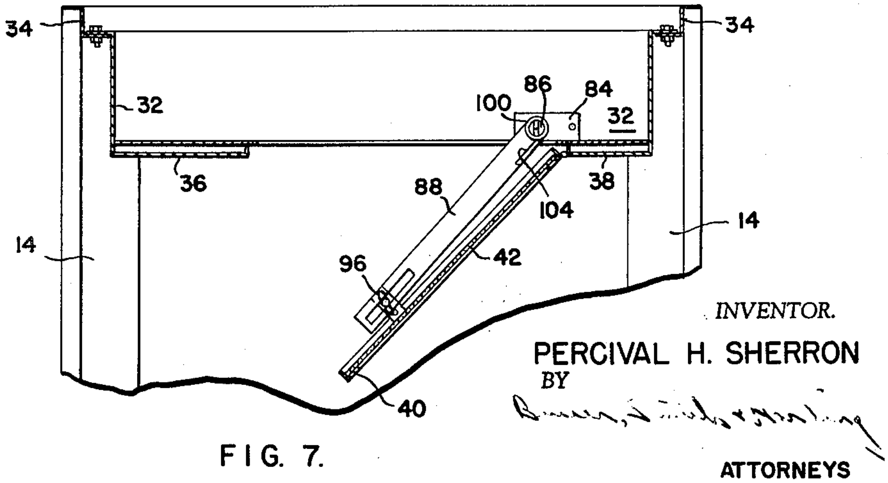
FIGURE 7 is a showing of the same portion of the structure shown in FIGURE 5 but showing the hinged ceiling panel in a partially open position.

In FIGURES 5–7 there is shown an alternative embodiment of the invention in which the same general ceiling structure is employed as was employed in the embodiment of the invention shown in FIGURES 2–4 and includes a ceiling structure having side panels 32, stationary bottom panels 36 and 38 and a frame 40 supporting a glass panel 42 and hingedly connected to the panel 34 at 44.

In this embodiment of the invention a mounting bracket 84 is affixed to each of the side panels 32 adjacent to the ends of the hinge 44. Pins 86 are affixed to the brackets 84 and extend inwardly toward each other. Each of the pins extends through a bore in one end of a bar 88 which is pivotally mounted thereon. The other end of each of the bars 88 is provided with a slot 90 adapted to receive a bolt 92 extending through a bracket 94 affixed to the angle frame 40 of the hinged panel. A wing nut 94 is threaded onto each of the bolts 92 and when loosely threaded thereon permits sliding motion between the bar 88 and the bracket 94. When the wing nut 96 is tightened sliding motion is prevented between the bar 88 and the bracket 94.

A coil spring 100 is mounted over each of the pins 86 and one end of the spring is secured in a slot 102 in the end of the pin. The other end of each of the springs has an extended portion 104 acting against the bar 88. The spring is arranged in such a manner, as shown in the drawings, to urge the bar 88 in clockwise rotation around the pins 86 as viewed in FIGURE 5, thus urging the hinged panel into a closed position as shown in FIGURES 5 and 6. When it is desired to open the hinged panel it is merely necessary to pull the panel downwardly as shown in FIGURE 7 causing the panel to rotate around its hinge 44 and causing each of the bars 88 to rotate around its pin 86. When the panel has been hinged downwardly to a desired degree, tightening of the wing nuts 96 will serve to lock the panel in an open position by preventing sliding motion between the bars 88 and their respective brackets 94.

While not shown in FIGURES 5, 6 and 7 it will be evident that the telephone booth ceiling structure shown therein is adapted to mount the same electrical apparatus as shown in FIGURES 2–4 and the downward hinging of the ceiling panel provides for access to this apparatus in the same manner as the hinging of the panel shown in FIGURES 2–4.

In FIGURE 8 there is shown yet another modification of the invention in which a bracket 108 is affixed to and extends upwardly from the hinged panel frame 40 adjacent to the hinged edge thereof. A rod 110 is pivotally connected to the upper end of the bracket 108 and extends into a cylindrical receiver 112. The end of the rod is provided with a piston forming washer 114. The opposite end of the tube 112 is pivotally mounted as indicated at 116 to a bracket 118 affixed to the panel 36. A spring 120 is positioned in the tube 112 between the piston 114 and the pivot forming means 116.

It will be evident upon viewing FIGURE 8 that with the apparatus in the position shown the spring 120 will be partially compressed, will be urging the rod 110 to the right as viewed in the figure thus urging the hinged panel to rotate in a clockwise direction around its hinge 44. The arrangement thus serves to insure closure of the hinged panel.

When the panel is opened against the urging of spring 120 the plate 108 will rotate in a counterclockwise direction around the hinge 44 carrying the rod 110 downwardly as viewed in the drawing. When the right-hand end of the rod 110 passes below a line extending between the pivot 116 and the hinge 44 further movement of the hinged panel in a counterclockwise direction around the hinge 44 will permit the rod 110 to move outwardly of the tube 112 and thus expansion of the spring 120 will now urge the hinged panel toward an open position. Thus, this arrangement provides the same general functioning as the arrangement shown in FIGURES 2–4 in which, when the hinged panel is in a closed position, it is maintained in that position by the action of the spring and, when the hinged panel is in a substantially fully open position, it is urged in that position by the spring.

In FIGURES 9 and 10 there is indicated generally at 130 an embodiment of the invention in connection with a modified form of ceiling structure. This structure includes a horizontal diagonally extending member 131 and a pair of members 132 and 133 abutting the member 131 and forming a second diagonally extending member. The members extend between diagonally opposite corners of a telephone booth and are supported by the telephone booth corner posts not shown in FIGURES 9 and 10. The members 131, 132 and 133 have affixed thereunder support brackets 134 which support a stationary ceiling panel 136. The members 131 and 132 also have attached thereunder a pair of support brackets 138 supporting a stationary ceiling panel 140. The panels 136 and 140 form the lower surface of the ceiling structure and, in this embodiment of the invention, the ceiling structure does not include vertically extending side walls such as the side walls 32 included in the previously described embodiments of the invention.

The panels 136 and 140 are spaced apart and positioned therebetween is a panel 142. The panel 142 is rigidly affixed to a tubular member 144, lying on top of the left-hand side thereof as viewed in the figures, by means of a pair of brackets 146. A rod 148 extends through the cylindrical member and is affixed at each of its ends by means of brackets 160 to the panels 136 and 140.

As shown in fragmentary detail in FIGURE 11 the tubular member 144 is in spaced relation with the rod 148 and positioned therebetween and around the rod 148 is a coil spring 162. One end of the spring is affixed to the outside of the tubular member 144 as indicated at 164 and the other end of the spring is affixed to the rod 148 as indicated at 166 by being turned into a bore extending through the rod.

This arrangement provides a hinge mounting for the panel 142 whereby the panel may be swung downwardly as viewed in FIGURE 9 against the urging of the spring 162. The tension of the spring 162 may be adjusted by rotating the tubular member 144 in the brackets 146. It will be evident that the direction of spring tension is such as to urge the panel 142 into a closed position.

The panel 136 is provided with a cutout region in which there lies a glass panel 168. The panel 140 is provided with a similar cutout covered with a glass panel 170. The panel 142 is provided with a cutout covered by a glass panel 174. Booth illuminating means in the form of a lamp 176 is supported in a lamp receptacle 178 which is attached to the support member 131 in a position above the displaceable panel. Additional wiring and electrical apparatus may be positioned above the panels 136, 140 and 142 and it will be evident that displacement of the panel 142 will serve to provide for access to such wiring and apparatus which may include apparatus such as that described in connection with FIGURE 3.

It will also be evident that the various hinged panel closing means described in connection with FIGURES 2–8 may be adapted for employment with the structure shown in FIGURES 9 and 10 and, similarly, the spring hinged structures shown in FIGURES 9, 10 and 11 may be employed in connection with the structures shown in FIGURES 2–8.

It should, however, be particularly noted that in all of these arrangements the stationary panels and the movable panel present a clean unbroken surface on the underside of the ceiling structure and all of the hinge structures and the spring structures are positioned above the ceiling panels with no evidence thereof appearing below the ceiling panels.

Each of the foregoing modifications of the invention provides means continuously urging the hinged panel to remain in a closed position. In addition to this structure it is, however, desirable to provide latching means which will not only secure the movable panel in a closed position and prevent opening thereof by unauthorized persons but further the latching means is desirably provided in order to insure against accidental dropping of a ceiling panel in the event of a spring or other mechanical failure. Such latching means is shown in FIGURES 12–14 and will now be described.

In FIGURE 12 there is indicated generally at 180 a panel adapted to be the hinged panel in any of the foregoing modifications. In FIGURE 13 there is indicated generally at 182 a fragmentary portion of the panel indicated at 180 in FIGURE 12 and in FIGURE 14 there is indicated at 184 an even smaller fragmentary portion of the hinged panel. The panel is provided along one edge with a hinge 185. This hinge is identical to the hinge 44 described in connection with FIGURES 2–8. The opposite edge of the panel is provided with a flange 186 extending perpendicularly to the panel and in an upward direction when the panel is closed. A spring wire member 188 is positioned adjacent to the inside of the flange 186 and the central portion of the length of the wire 188 is secured to the flange by means of a nut and bolt arrangement 190. The two end portions of the wire 188 are thus free to be deflected inwardly or away from the flange 186.

The end portions of the spring wire 188 are each formed with an outwardly extending loop 191 which passes through an opening 192 in the flange 186 best shown in FIGURE 13. The return end of the loop 191 passes back through the opening 192 and is turned upwardly as indicated at 194 terminating in a hook 196. The hook 196 extends forwardly or out toward the flange 186. Brackets 198 are affixed to the movable panel flange 200 and provide a retainer under which the return length of the loop 190 is slidably positioned. The panel flange 200 and the portion of the panel lying therebelow are provided with aligning slots 202, a pair of aligning slots being provided on each side of the nut and bolt arrangement 190 and spaced slightly inwardly of the loops 190. These aligning slots are provided for the admission of a screw-driver or similar instrument extended upwardly from below the ceiling panel whereby the springs 188 may be moved backwardly withdrawing the loops 191 backwardly in a position in which they will lie over the flange 200.

In FIGURE 13 there is indicated generally at 204 a fragmentary portion of the adjacent stationary ceiling panel. This ceiling panel includes a vertically extending flange 206 provided with an opening 208 in alignment with each of the loops 191 when the hinged panel is in closed position. It will be evident that when the hinged panel is in closed position the spring action of the wire 188 will urge each of the loops 191 into its aligning opening 208 thus serving to securely latch the hinged panel in closed position.

In the event that for some reason the latch 191 is not securely engaged and the spring means described in connection with the various FIGURES 2–11 fails to function or such spring means is not provided, the hinged panel may drop downwardly whereupon its downward motion will be limited by engagement of the hooks 196 with the upper surface of the stationary panel 204 as shown in FIGURE 14. Thus this structure provides both a latch means in the form of loops 191 and safety means in the form of the hooks 196.

What is claimed is:

1. In a telephone booth, a ceiling structure forming a chamber adapted for housing electrical equipment and wiring for the telephone booth comprising first and second positionally fixed panels, a third panel disposed in coplanar relation to and interposed between said fixed panels and forming therewith a horizontally extending bottom wall for said chamber, means for hinging said third panel to the first one of said fixed panels for swinging movement downwardly thereby to afford access to the electrical equipment and wiring housed in said chamber means including a spring for selectively urging said hinged panel toward closed position when said hinged panel is disposed to one side of a predetermined partially open position and toward open position when said hinged panel is disposed on the opposite side of said predetermined position, and one piece combination primary and secondary latch means consisting of a single rod-like member anchored to said hinged panel including a primary latch portion projected into said second fixed panel for releasably securing said hinged panel in a closed position, and a secondary latch portion overhanging said second fixed panel and adapted for engaging with said second fixed panel when said hinged panel is partially open, said rod-like member being inherently resilient, and being displaceable against the influence of said inherent resilience for withdrawal of said primary latch portion from said second fixed panel and for withdrawal of said secondary latch portion to a position clear of said second fixed panel.

2. In a telephone booth, a ceiling structure forming a chamber adapted for housing electrical equipment and wiring for the telephone booth comprising first and second positionally fixed panels, a third panel disposed in coplanar relation to and interposed between said fixed panels and forming therewith a horizontally extending bottom wall for said chamber, means for hinging said third panel to the first one of said fixed panels for swinging movement downwardly thereby to afford access to the electrical equipment and wiring housed in said chamber means including a spring for selectively urging said hinged panel toward closed position when said hinged panel is disposed to one side of a predetermined partially open position and toward open position when said hinged panel is disposed on the opposite side of said predetermined position, and one-piece combination primary and secondary latch means consisting of a single rod-like member anchored to said hinged panel including a primary latch portion disposed a substantial distance from said anchorage and extending laterally from the main body of said rod-like member for projection into said second fixed panel for releasably securing said hinged panel in a closed position, and a secondary latch portion having a terminal portion of said rod-like member hooked over said second fixed panel and disposed in superposed spaced relation thereto for engaging with said second fixed panel when said hinged panel is partially open, said rod-like member being inherently resilient, and being displaceable against the influence of said inherent resilience for withdrawal of said primary latch portion from said second fixed panel and for withdrawal of said secondary latch portion to a position clear of said second fixed panel.

3. A telephone booth according to claim 1 wherein said means for urging said hinged panel comprises means for varying the urging force.

4. A telephone booth structure according to claim 1 wherein said means for urging said panel toward closed and open positions includes a plurality of interconnected links extending across said hinged panel with one of said links pivotally connected to the second one of said fixed panels and another link pivotally connected to said hinged panel.

References Cited in the file of this patent

UNITED STATES PATENTS

| | | |
|---|---|---|
| 1,948,755 | Gullicksen | Feb. 27, 1934 |
| 1,979,072 | Kuntz | Oct. 30, 1934 |
| 2,204,359 | Hendrickson | June 11, 1940 |
| 2,247,028 | Kuntz | June 24, 1941 |
| 2,328,618 | Corso | Sept. 7, 1943 |
| 2,792,245 | Dasher et al. | May 14, 1957 |
| 2,804,326 | Newcomer | Aug. 27, 1957 |
| 2,828,505 | Hutzelman | Apr. 1, 1958 |
| 2,899,542 | Mauro | Aug. 11, 1959 |
| 2,908,032 | Hatch | Oct. 13, 1959 |